（12）United States Patent
Pandya

(10) Patent No.: US 9,951,509 B2
(45) Date of Patent: Apr. 24, 2018

(54) WATER TREATMENT SYSTEM

(71) Applicant: Ken Pandya, Plano, TX (US)

(72) Inventor: Ken Pandya, Plano, TX (US)

( * ) Notice: Subject to any disclaimer, the term of this patent is extended or adjusted under 35 U.S.C. 154(b) by 0 days.

(21) Appl. No.: 15/479,166

(22) Filed: Apr. 4, 2017

(65) Prior Publication Data

US 2017/0204596 A1    Jul. 20, 2017

Related U.S. Application Data

(62) Division of application No. 14/939,755, filed on Nov. 12, 2015, now Pat. No. 9,611,635.

(51) Int. Cl.
*E03F 5/14* (2006.01)
*C02F 1/00* (2006.01)
(Continued)

(52) U.S. Cl.
CPC .............. *E03F 5/14* (2013.01); *B01D 24/105* (2013.01); *B01D 24/4636* (2013.01); *B01D 33/048* (2013.01); *C02F 1/004* (2013.01); *C02F 1/5281* (2013.01); *C02F 1/66* (2013.01); *C02F 3/04* (2013.01); *C02F 3/2866* (2013.01); *C02F 7/00* (2013.01); *C02F 2001/007* (2013.01); *C02F 2003/001* (2013.01); *C02F 2101/32* (2013.01);
(Continued)

(58) Field of Classification Search
None
See application file for complete search history.

(56) References Cited

U.S. PATENT DOCUMENTS 4,722,785 A * 2/1988 Reid ..................... C02F 3/1257
                                                         210/194
5,185,085 A    2/1993 Borgren
                    (Continued)

FOREIGN PATENT DOCUMENTS

WO    WO-2006123868 A1 * 11/2006 ................ C02F 3/00

OTHER PUBLICATIONS

Chapter 5, "Open-Channel Flows," https://ocw.mit.edu/courses/earth-atmospheric-and-planetary-sciences/12-090-introduction-to-fluid-motions-sediment-transport-and-current-generated-sedimentary-structures-fall-2006/course-textbook/ch5.pdf.*
(Continued)

*Primary Examiner* — Chester T Barry
(74) *Attorney, Agent, or Firm* — Jack D. Stone, Jr., Esq.; Scheef & Stone, L.L.P.

(57) ABSTRACT

A system and process for removing from an aqueous stream impurities such as grit, particulates, floating debris, suspended solids, turbidity, bacteria, fecal coliform, oil, grease, color, and the like, and for treating an unacceptable biological oxygen demand, chemical oxygen demand, and/or dissolved oxygen by utilizing a treatment system positioned partially in a channel adapted to a flow of the aqueous stream. The treatment system comprises a containment zone for containing the aqueous stream for treatment by at least one of traveling or stationary screen filtration, aeration, anaerobic and/or aerobic digestion, clarification, media filtration, chemical addition, disinfection, pH adjustment, particulate removal, and/or the like. A partition wall is provided to bypass untreated water such as storm water. After passing untreated waste water through the treatment zone, the treated aqueous stream may be recycled for further use or discharged to its desired destination, such as a lake, river, or ocean.

7 Claims, 4 Drawing Sheets

(51) Int. Cl.
*C02F 7/00* (2006.01)
*B01D 33/048* (2006.01)
*C02F 3/28* (2006.01)
*C02F 3/04* (2006.01)
*C02F 1/66* (2006.01)
*C02F 1/52* (2006.01)
*B01D 24/10* (2006.01)
*B01D 24/46* (2006.01)
*C02F 3/00* (2006.01)
*C02F 101/32* (2006.01)
*C02F 103/00* (2006.01)

(52) U.S. Cl.
CPC .. *C02F 2103/001* (2013.01); *C02F 2103/007* (2013.01); *C02F 2303/16* (2013.01); *C02F 2307/08* (2013.01)

(56) References Cited

U.S. PATENT DOCUMENTS

| | | | |
|---|---|---|---|
| 5,228,998 A | 7/1993 | DiClemente et al. | |
| 6,033,559 A * | 3/2000 | Bender | B09C 1/002 |
| | | | 210/150 |
| 6,231,766 B1 | 5/2001 | Hausin | |
| 8,616,279 B2 * | 12/2013 | Symington | E21B 43/247 |
| | | | 166/261 |
| 8,721,886 B2 | 5/2014 | Ahn et al. | |
| 9,611,635 B1 | 4/2017 | Pandya | |
| 2004/0115003 A1 * | 6/2004 | Johnston | E02B 8/023 |
| | | | 405/63 |
| 2004/0245180 A1 | 12/2004 | Gomes De Oliveira | |
| 2005/0109696 A1 * | 5/2005 | Sorenson, Jr. | B09C 1/002 |
| | | | 210/610 |
| 2005/0279713 A1 * | 12/2005 | Osborn | B01F 3/0473 |
| | | | 210/760 |
| 2010/0038310 A1 * | 2/2010 | Shafer | C02F 9/00 |
| | | | 210/605 |
| 2011/0163046 A1 * | 7/2011 | Neal | C02F 1/325 |
| | | | 210/748.11 |
| 2012/0118819 A1 * | 5/2012 | Bachar | C02F 3/101 |
| | | | 210/616 |
| 2012/0130571 A1 | 5/2012 | Dunkle | |
| 2014/0367342 A1 | 12/2014 | Horton et al. | |
| 2015/0165346 A1 | 6/2015 | Puleo et al. | |
| 2015/0183663 A1 * | 7/2015 | Kuik | C02F 1/32 |
| | | | 210/748.11 |
| 2016/0024736 A1 | 1/2016 | Jauncey et al. | |
| 2016/0376181 A1 * | 12/2016 | An | E02B 3/18 |
| | | | 210/170.1 |

OTHER PUBLICATIONS

NOAA Nautical Chart 12311, http://www.charts.noaa.gov/OnLineViewer/12311.shtml, 47th edn. (Jan. 2017) (downloaded Oct. 26, 2017).*

"A Whale's Tale," sailing blog, http://flukeblog.blogspot.com/2011/06/making-wake-everyday-part-2-c-canal-and.html, published 2010 (downlaoded Oct. 26, 2017).* http://www.tidaltrail.org/safety-stewardship/safety/hazards/ downloaded Oct. 26, 2017.*

* cited by examiner

WATER TREATMENT SYSTEM

CROSS-REFERENCE TO RELATED APPLICATIONS

This application is a divisional application of Ser. No. 14/939,755, filed on Nov. 12, 2015, now U.S. Pat. No. 9,611,635, issued on Apr. 4, 2017, which application is hereby incorporated herein by reference, in its entirety.

TECHNICAL FIELD

This invention relates to a high efficiency water treatment system and process wherein a treatment zone is positioned at least partially in a flowing stream so that water flowing into the stream can be directed into the treatment zone and untreated water can flow through a bypass channel.

BACKGROUND

In many areas, especially in developing parts of the world, very high population density areas frequently surround streams which carry highly polluted water to larger streams, rivers, oceans, lakes, and/or the like. As a result of the high population density, land is very expensive, making it expensive to acquire land for, and to build, waste water treatment facilities in areas where the waste streams are generated. Therefore, in many areas, drainage canals channel waste water streams from these densely populated areas, with no treatment whatsoever of the waste water, into running streams, rivers, lakes, oceans, and/or the like. As a result, all the streams become polluted rather than merely the ones flowing from the very densely populated areas. This results in very unhygienic conditions in all the streams. Further, untreated waste streams may be created from various industries or other sources in the areas.

There are several commercial water and waste water treatment processes in use all over the world that utilize various forms of water treatment processes for purification of water and waste water treatment streams. Such processes may be designed for selective treatment of parameters such as biological oxygen demand, chemical oxygen demand, fecal coliform, oil and grease, total suspended solids, and dissolved oxygen, and further, such processes may be used in conventional techniques including coagulation, clarification, purification, aeration, generic or specially formulated enzymes, and various disinfection techniques to achieve specific limited goals in treating such contaminated waste water streams. In most of these cases the conventional processes require significant amounts of financial resources and several months, even years, of planning. Such projects require the acquisition of land to construct such processes, and incur engineering costs, construction costs, and the procurement of process components, including pumps, piping, valves, instruments, controls, and associated costs for construction, maintenance, permitting, and operation of such systems.

In most of the conventional processes the unit operations require performance in separate process zones such as ponds with pond liners, concrete basins, process reaction tanks made from expensive materials of construction and the like. Such processes also require additional costs associated with more space for installing more equipment and many years of project engineering. Some technologies exist for cleaning rivers and ponds by utilizing both trash strainers or the like for trash removal, or oil skimmers for skimming oil.

In view of the foregoing, what is needed is a waste water treatment process which is more space efficient and economical than conventional technologies permit which is, for example, not a trash removal process, an oil skimming process alone, or an air bubbling process alone.

SUMMARY

The present invention, accordingly, is a high efficiency water treatment process directed for utilizing a portion of the drainage canal itself for carrying out the needed waste water treatment, without the need to acquire land in densely populated areas or the like. It is designed to improve water quality for treatment of impurities including biological oxygen demand, chemical oxygen demand, fecal coliform, oil and grease, suspended solids, and so on that can be harmful to humans, marine and land based animals, and plants. Additionally, this process will provide water having a clear appearance, in which suspended solids greater than 30 microns are removed, and which contains at least three milligrams per liter of dissolved oxygen, as required for discharge of water into surface water bodies such as flowing rivers, ponds or oceans.

More specifically, the present invention provides a system for removing impurities from an aqueous stream containing at least some impurities such as particulates, floating debris, suspended solids, turbidity, bacteria, fecal coliform, oil, grease, color, and the like, and producing an aqueous stream having an acceptable biological oxygen demand, chemical oxygen demand, and dissolved oxygen demand. This is achieved by treating at least a first portion of the aqueous waste stream in a treatment system positioned at least partially in a channel adapted to monitor a flow of the aqueous stream. The treatment system includes a containment zone for containing a first portion of the aqueous stream for treatment by at least one of anaerobic and aerobic digestion, clarification, filtration, chemical addition, disinfection, pH adjustment, particulates removal, and the like. An inlet into the treatment system from the channels is provided for passing at least a portion of the aqueous stream into the treatment zone. At least one reagent inlet is positioned to pass at least one reagent into the treatment zone. An outlet from the treatment zone is provided for passing a treated aqueous stream out of the treatment zone.

The invention also provides for a method for treating an aqueous stream containing at least some impurities such as particulates, floating debris, suspended solids, turbidity, bacteria, fecal coliform, oil, grease, color, and the like and having unacceptable biological oxygen demand, chemical oxygen demand, or dissolved oxygen demand. It achieves this by treating at least a first portion of the aqueous stream in a treatment zone positioned at least partially in a channel adapted to monitor a flow of the aqueous stream.

The present invention is a high efficiency water treatment process for removing impurities from aqueous streams containing various impurities such as grit, floating debris, suspended solids, turbidity, bacteria, and fecal coliform having low biological oxygen demand, low chemical oxygen demand, and/or low dissolved oxygen and color. The process preferably includes steps of grit removal, filtration by either traveling or stationary screens, anaerobic and/or aerobic digestion, clarification, media filtration, chemical addition, disinfection, pH adjustment, particulate removal, and/or the like. This process can provide desired levels of dissolved oxygen which is a needed component for aquatic life and vegetation. The process is an easily implemented methodology for the treatment of aqueous streams containing various types of impurities to the extent that the treated water may be suitable for the use of humans, animals, land irrigation, industrial use, and the like. The process is particularly effective in developing countries where it is a common practice to discharge either untreated or partially treated sewage from common households, open defecation, or untreated or partially treated municipal or industrial water from the population living on the banks of streams near urban populations, slums or either planned or semi planned communities. It is not uncommon to find highly polluted waste water streams directly discharged into beautiful natural springs, rivers, oceans, or lakes, thus contaminating receiving bodies of water. Such pollution can enter ground water supplies or underwater streams which can contaminate entire supplies of fresh water, cause serious risks to humans and animals, and enter the food chain through aquatic animals or plants. The conditions in the vicinity of such streams and channels pose serious risks to humans and animals due to bad smell, provide breeding grounds for heavy populations of mosquitoes, cause very unhygienic conditions, and bring down property values in the affected area.

One unique feature of the process of the present invention is the separation into a treatment zone of highly contaminated waste water streams, allowing relatively clean water streams, such as storm water during rainy seasons, to continue to flow in a parallel path of the channel in which the treatment zone is placed. Yet another unique feature is to facilitate flow control and quality measurement of the waste water streams, which will be highly beneficial for introducing accurate levels of water treatment chemicals.

Users of this process and treatment zone will realize numerous advantages over conventional processes and treatment zones, including savings in construction costs, land acquisition and/or development costs, operating costs, and project completion time. The effluent from the process of the present invention will be significantly purified, making it possible to either recycle or use the treated water for various uses including irrigation, swimming, sustaining the life of aquatic animals and plants, and the like. Equally significant, the process is very simple to deploy, simple to operate and maintain, does not require highly skilled operators, and offers low costs of maintenance. Users of this process will also quickly realize the benefits of selecting a location in a section of the drainage channel or canal or creek or rivers to take maximum advantage of the natural topography such as the height of the bank, and the width, depth, slope, and flow characteristic of the intended selected process location. The user may also realize the benefit of using locally available materials to construct barriers, filter media, and the like.

In most conventional processes for treating waste water containing streams the unit operations require execution in separate process blocks such as ponds, pond liners, concrete basins, and process reaction tanks constructed from expensive materials. Such systems require additional costs associated with obtaining more space when installing equipment and many years of project planning. By using the treatment zone of the present invention, many of these difficulties are overcome and equipment costs are minimized. The process of the present invention allows users to employ conventional unit processes such as screening, aerobic treatment, anaerobic treatment, media filtration, and chemical treatment. Such unit processes, per se, are well-known and are combined as needed in the present process and the treatment zone which is constructed in a way to use the available space and flowing streams, ponds or the like. The goal of the process of the present invention is to meet the affluent standards established by the various state and local environmental regulatory agents for discharge to surface water bodies which are outlined as representative standards below:

| | |
|---|---|
| BOD: | <30 mg/l |
| TSS: | <20 mg/l |
| Turbidity | <10 NTU |
| Particle size | <30 micron |
| Oil and grease | <2 mg/l |
| Ammonia: | <20 mg/l |
| Pathogens (E. coli) | <150 MPN |
| Odor | No significant odor |
| Dissolved oxygen | >3 mg/l |
| Appearance | Clear |
| Sludge digested | In situ |

In addition to meeting the effluent criteria above, the process of the present invention is effective for producing minimal amounts of solids and may be operated by minimal level operator skills.

The process of the present invention achieves such goals and objectives by integrating several unit processes in a seamless manner utilizing a part or a complete cross section out of creeks, rivers, or the like, wherein either untreated or partially treated water and waste water streams are being discharged to flowing rivers, other streams, ponds, an ocean, or the like. By utilizing the drainage canals or stream channels as part of the treatment process and treatment zone, there is no need for acquiring additional land, constructing ponds, pond liners, storage tanks, or process tanks. By using the natural direction of flow and gradual change of elevation to promote movement of water or waste water through the natural drainage open channels, there is no need for pumping large streams of water. In most cases, the process utilizes extremely low levels of energy to drive electric motors for specifically designed aeration devices, traveling screens, forwarding pumps, or chemical metering pumps. A representative flow sheet is discussed below with respect to FIG. 1.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF PREFERRED EMBODIMENTS

Figure 1:
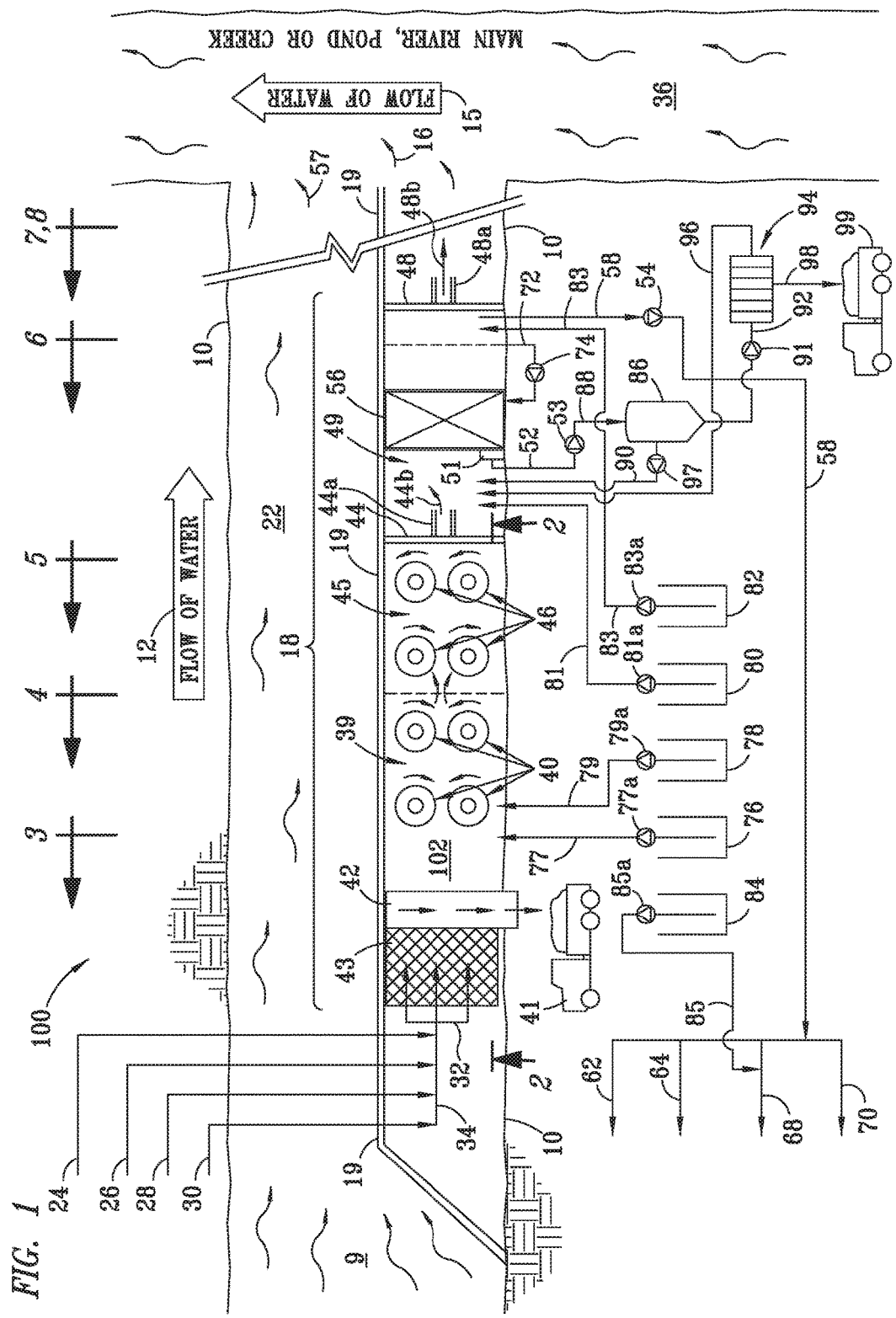
FIG. 1 is a schematic diagram exemplifying a waste water facility positioned in a stream according to principles of the present invention.

Refer now to the drawings wherein depicted elements are, for the sake of clarity, not necessarily shown to scale and wherein like or similar elements are designated by the same reference numeral through the several views. In the interest of conciseness, well-known elements may be illustrated in schematic or block diagram form in order not to obscure the present invention in unnecessary detail, and details concerning various other components known to the art, such as filters, aerators, and the like necessary for water treatment, have not been shown or discussed in detail inasmuch as such details are not considered necessary to obtain a complete understanding of the present invention, and are considered to be within the skills of persons of ordinary skill in the relevant art. Additionally, as used herein, the term "substantially" is to be construed as a term of approximation.

Referring to FIG. 1 of the drawings, the reference numeral 100 generally designates a high efficiency water treatment process and system embodying features of the present invention. The system 100 includes a channel 9 having walled stream banks 10, and a waste water, or aqueous, feed stream which may include storm water supplied through a line 24, partially treated industrial water supplied through a line 26, partially treated municipal waste supplied through a line 28, and aqueous sewage supplied through a line 30. These aqueous streams may be supplied through separate lines 24, 26, 28, 30, a combined line (e.g., a pipe) 34, or as an aqueous stream taken from channel 9. For purposes of illustration herein, the aqueous streams will be collectively described as coming through the combined line 34.

A containment zone, also referred to herein as a treatment zone, 18 is shown positioned in the channel 9, the treatment zone 18 being defined on one side by a dividing wall 19 and on the other side by one of the walled stream banks 10. A bypass channel 22 is provided for the flow of flood water and the like around treatment zone 18 during periods of rain and other high water flow. A direction of flow of water in channel 9, including treatment zone 18 and bypass channel 22, is designated by an arrow 12.

Waste aqueous stream 34 is shown passing into treatment zone 18 via an inlet duct 32 where it joins an aqueous stream 102 which preferably flows into and through traveling screen, or alternatively stationary screen, filter 43 for the removal of coarse particulates and grit. As shown most clearly in FIGS. 2 and 3, aqueous stream 102 passes through traveling filter screen 43, moving in the direction of arrows 43a (FIG. 2), which may alternatively be a mesh-screen filter, for removing and passing waste (e.g., collected trash or suspended solids) into a solid removal system, exemplified by conveyer belts 42 and 47 which convey waste to a truck 41. As further depicted in FIG. 2, the treatment zone 18 defines bottoms 13 and 14 which slope downwardly, as brought out by horizontal line 11, toward a river 36.

Figure 2:
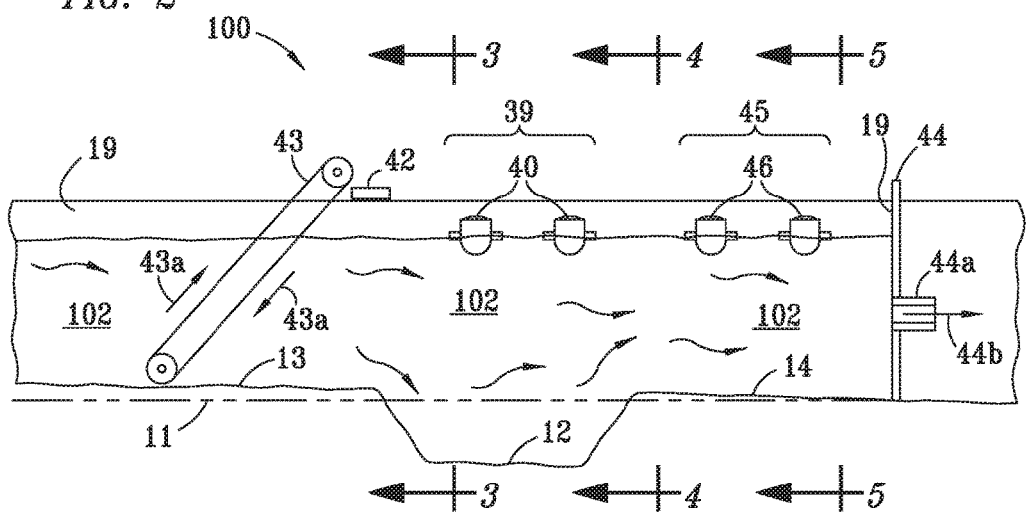
FIG. 2 is a schematic diagram of a traveling filter screen used in an initial filtering process, taken along the line 2 of FIG. 1.
Figure 3:
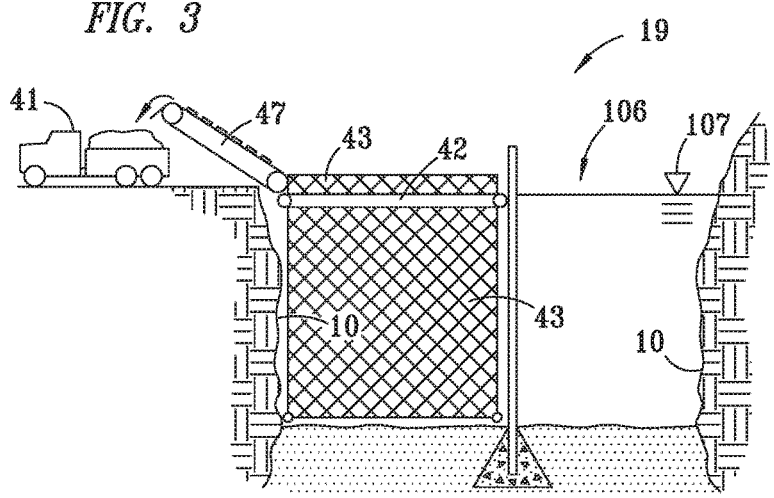
FIG. 3 is a schematic diagram of a treatment zone including an inlet screen positioned in a channel, taken along the line 3 of FIG. 1.
Figure 4:
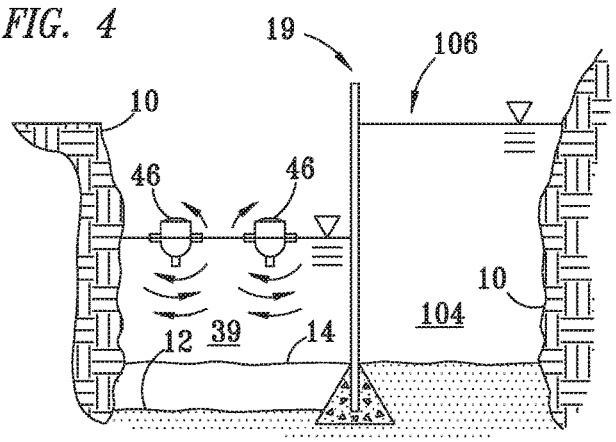
FIG. 4 is a schematic diagram of aeration devices positioned in a deep end of the treatment zone, taken along the line 4 of FIG. 1.
Figure 5:
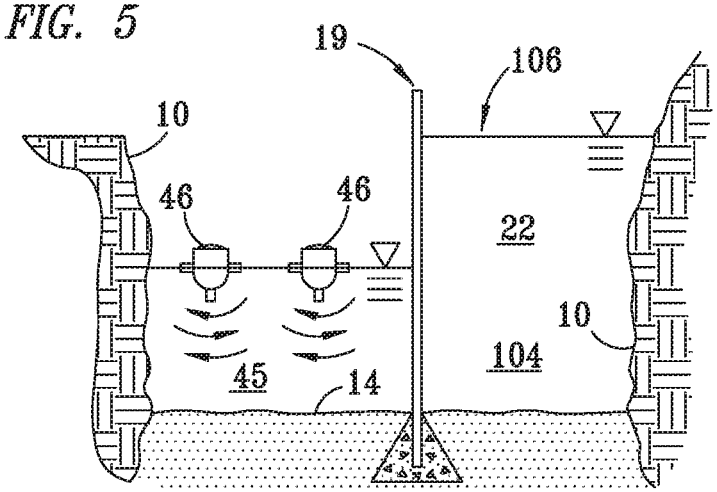
FIG. 5 is a schematic diagram of aeration devices in a shallow end of the treatment zone, taken along the line 5 of FIG. 1.

Waste aqueous stream 34 is then preferably subjected to aeration in a sub-zone 39 of treatment zone 18 by aeration devices 40, and in a sub-zone 45 of treatment zone 18 by aeration devices 46. As shown in FIGS. 1 and 2, sub-zone 45 terminates in a partition 44 having an outlet 44a. As shown in FIGS. 2, 4, and 5, bottom 14 of sub-zone 45 is preferably relatively shallower than a bottom 12 of sub-zone 39, though sub-zone 39 may alternatively be shallower than sub-zone 45. A deeper sub-zone facilitates anaerobic reactions, or digestion, for certain biological treatment processes, while a shallower sub-zone facilitates aerobic reactions, or digestion, for other biological treatment processes. The aerated waste stream is recovered from treatment sub-zone 45 via outlet 44a, as indicated by arrow 44b, and passes into clarification zone 49, where the water is clarified in a manner well-known in the art. The level of the water in the clarification zone 49 then rises to the level of the top of a media filter 56, and the water is then preferably evenly distributed across the top of media filter 56 via a suitable inlet overhead distributor 56a (FIG. 6), and it then flows downwardly through filter 56. Filter 56 preferably comprises, by way of example and not limitation, sand, anthracite, garnet, and/or the like, to remove fine particulates remaining in the treated water. After the water has been filtered by filter 56, it passes through a partition 48 by way of an outlet 48a and is discharged as shown by arrows 48b and 16 into river 36 having a flow as shown by arrow 15.

Untreated water flows from bypass channel 22 as shown by arrows 57 into river 36. While water passing through bypass channel 22 is untreated, it is relatively clean water, resulting from high water flows in channel 22 and the like, and is allowed to pass through channel 22 as required by the flow volume in channel 22.

Figure 6:
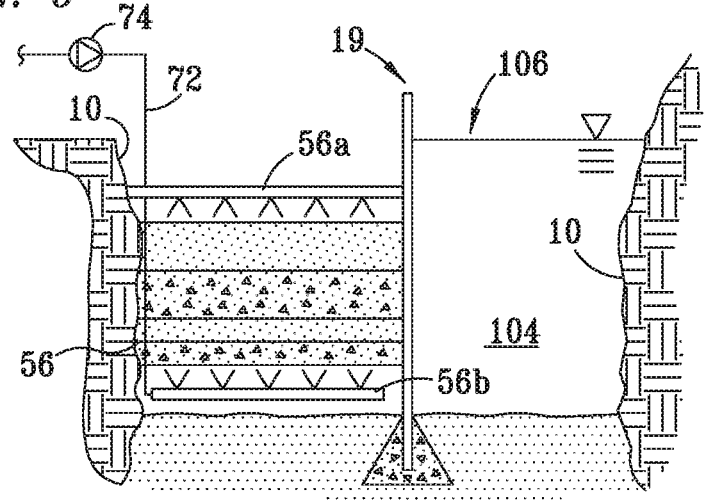
FIG. 6 is a schematic diagram of a filter in the treatment zone relative to a high level in the channel, taken along the line 6 of FIG. 1.

Referring to FIG. 6, the back (bottom) side of filter 56 is preferably periodically back-washed using an underdrain distributor 56b supplied through line 72 with clean, filtered water from pump 74. When the filter 56 backwashes through the underdrain distributor 56b, backwash effluent (i.e., dirty water) is preferably collected in overhead distributor 56a, then the dirty water is collected in a backwash collection sump 51. Dirty backwash is then collected by pump 53, and preferably transferred to the sludge thickener 86. Underdrain distributor 56b preferably incorporates features of the filter screen nozzle and system for fluid processing described in greater detail in U.S. Pat. No. 6,730,229, issued on May 4, 2004, to Ken V. Pandya, which patent is incorporated herein by reference in its entirety.

Treatment chemicals may be supplied into the treatment zone 18, preferably through sub-zone 39, via a chemical feed system 76 and pump 77a through line 77, and via an alkaline injection system 78 and pump 79a through a line 79. Coagulation chemicals may be injected by coagulation injection system 80 and pump 81a through a line 81 into the treatment zone 18, preferably into the aerated waste stream flowing from outlet 44a. A pH adjustment system 82 and pump 83a may be used to inject pH-adjusting chemicals through a line 83 into the flow of water from outlet 48a. A disinfectant injection system 84 and/or the like and pump 85a may be utilized to inject disinfectant through a line 85 into a line 68 so that line 68 may be used as a potable water supply.

Pump 53 is preferably also used to pump a stream carrying sludge via lines 52 and 88 from backwash collection sump 51 ahead of filter 56 to a sludge thickener unit 86 for further separation of particles from a liquid stream which is pumped with pump 97 via a line 90 back to treatment zone 18 ahead of filter 56. Concentrated sludge from sludge thickener unit 86 is pumped by pump 91 through a line 92 to a filter press system 94 to form filter cake (typically carrying 25-50% solids, with the remaining portion being water). Filtrate is then recycled back via a line 96 to zone 18 ahead of filter 56, and the filter cake carrying solids is passed through a line 98 to recovery truck 99.

A portion of the aqueous stream passed through filter 56 is preferably pumped by a pump 54 via a line 58 as irrigation water via line 62, industrial water via line 64, potable water via line 68, and/or general purpose water via line 70 for other uses. Pump 54 is preferably enabled to transfer all or a portion of treated water from a lower level within the canal to a higher level, such as a township which may be located at higher grounds.

In FIG. 6, a schematic view of treatment zone 18 is shown taken along line 6 of FIG. 1. This view shows the presence of filter 56 and a level and a bypass channel of storm water 104 at a high level 106 indicative of a flood condition or the like.

Figure 7:
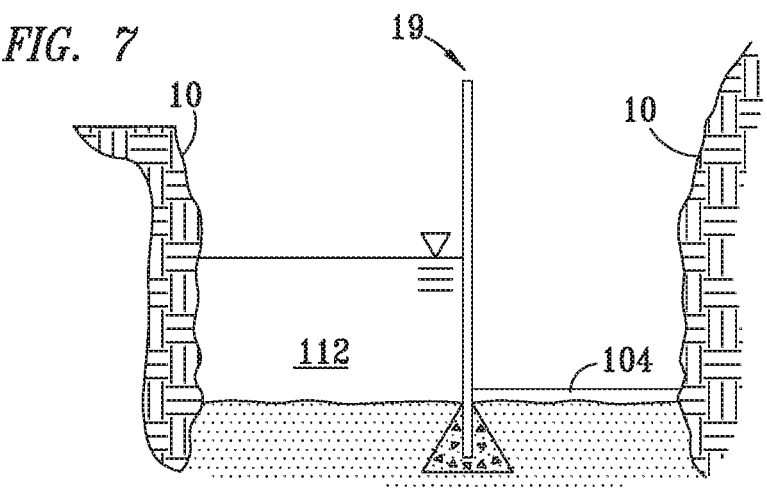
FIG. 7 is a schematic diagram of treated water stored in the treatment zone, taken along the line 7 of FIG. 1.

In FIG. 7, a partially treated water zone 112, representing temporary water storage, is shown taken along line 7 of FIG. 1. The water level 104 in the channel 22 is shown at a low level, indicative of the flow of water during arid conditions, and indicating that most of the water collected in treatment zone 18 may require pumping or the like to channel 22. It is understood that any time there is temporary or permanent storage of water, means are preferably provided to transfer the stream away for the desired application. By way of example, but not limitation, a portion of the treated water stream may be used to backwash the filter 56 when it gets dirty, as discussed above with respect to pump 74.

Figure 8:
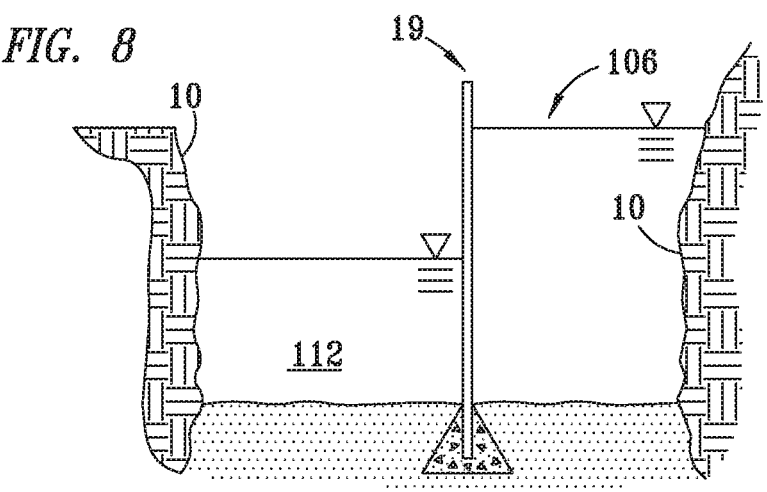
FIG. 8 is a schematic diagram of a high level in the channel relative to the level in the treatment zone, taken along the line 8 of FIG. 1.

In FIG. 8, a storage system is shown that is similar to that of FIG. 7, but with the water in the bypass channel 22 at flood stage as shown at level 106.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

The invention claimed is:

1. A system comprising:
a partition wall positioned in an aqueous stream in a natural drainage open channel to form (1) a treatment zone through which passes a first portion of the aqueous stream containing at least some impurities such as particulates, floating debris, suspended solids, turbidity, bacteria, fecal coliform, oil, grease, color, and the like and having an unacceptable biological oxygen demand, chemical oxygen demand, or dissolved oxygen, wherein the treatment zone further comprises at least one of a traveling screen filter, clarification means, media filtration, and pH adjustment means configured for treating the first portion of the aqueous stream; and (2) a bypass channel through which passes untreated water in the natural drainage channel, including storm water, around the treatment zone;
an inlet into the treatment zone for passing at least the first portion of the aqueous stream into the treatment zone;
at least one reagent inlet positioned to pass at least one reagent into the treatment zone; and
an outlet from the treatment zone for passing a treated aqueous stream out of the treatment zone.

2. The system of claim 1 wherein the treatment zone further comprises a stationary screen filter configured for treating the first portion of the aqueous stream.

3. The system of claim 1 wherein the treatment zone further comprises aerobic digestion means for treating the first portion of the aqueous stream.

4. The system of claim 1 wherein the treatment zone further comprises anaerobic digestion means for treating the first portion of the aqueous stream.

5. The system of claim 1 wherein the treatment zone further comprises chemical addition means for treating the first portion of the aqueous stream.

6. The system of claim 1 wherein the treatment zone further comprises particulate removal means for treating the first portion of the aqueous stream.

7. The system of claim 1 wherein the treatment zone includes an aeration zone configured for aerating at least a portion of the first portion of the aqueous stream.

* * * * *